United States Patent [19]
Omiya

[11] Patent Number: 4,508,894
[45] Date of Patent: Apr. 2, 1985

[54] ACID-TYPE CARBOXYMETHYL CELLULOSE AND PROCESS FOR PREPARING THE SAME

[75] Inventor: Takeo Omiya, Himeji, Japan

[73] Assignee: Daicel Chemical Industries Ltd., Osaka, Japan

[21] Appl. No.: 565,145

[22] Filed: Dec. 23, 1983

[30] Foreign Application Priority Data

Dec. 28, 1982 [JP] Japan ................. 57-230070
Jul. 23, 1983 [JP] Japan ................. 58-134860

[51] Int. Cl.³ ..................... C08B 11/00; C08B 11/20
[52] U.S. Cl. .............................. 536/89; 536/87; 536/98
[58] Field of Search ..................... 536/89, 87, 98

[56] References Cited

U.S. PATENT DOCUMENTS

| | | | |
|---|---|---|---|
| 1,599,508 | 9/1926 | Altwegg et al. | 536/89 |
| 1,767,382 | 6/1930 | Leuchs | 536/87 |
| 2,331,858 | 10/1943 | Freeman et al. | 536/89 |
| 2,420,949 | 5/1947 | Hager et al. | 536/98 |
| 2,476,331 | 7/1949 | Swinehart et al. | 536/85 |
| 2,513,807 | 7/1950 | Lamborn | 536/87 |
| 2,698,322 | 12/1954 | Leaf | 536/89 |

FOREIGN PATENT DOCUMENTS

| | | | |
|---|---|---|---|
| 151803 | 2/1952 | Australia | 536/85 |
| 37-11550 | 8/1962 | Japan | 536/85 |

*Primary Examiner*—Ronald W. Griffin
*Attorney, Agent, or Firm*—Hubbell, Cohen, Stiefel & Gross

[57] ABSTRACT

The present invention provides a novel water-soluble acid-type carboxymethyl cellulose characterized by:

(a) having a total degree of substitution "x" by carboxymethyl group of 0.42 to 3.00 per anhydrous glucose unit, the degree of substitution "y" by acid-type carboxymethyl groups being to 100% of the total degree of substitution, provided that when "x" is less than 2.0, "y" shall be less than $(1.25 \times -0.5)$, the remaining carboxymethyl group being of the alkali salt type,

(b) having an average degree of polymerization of 50 to 1500, and (c) being soluble in water, which is useful as dispersant, carrier, coating agent and various other materials and also as an intermediate for carboxymethyl cellulose derivatives; and a process for preparing them.

11 Claims, 6 Drawing Figures

ACID-TYPE CARBOXYMETHYL CELLULOSE AND PROCESS FOR PREPARING THE SAME

BACKGROUND OF THE INVENTION

1. Field of the Invention

The present invention relates to water-soluble acid-type carboxymethyl cellulose which is useful as dispersant, carrier, coating agent and various other materials and also as an intermediate for carboxymethyl cellulose derivatives, and to a process for preparing the same.

2. Description of the Prior Art

Carboxymethyl cellulose (hereinafter referred to as "CMC") is a cellulose ether prepared by reacting cellulose with monochloroacetic acid in the presence of an alkali and is generally in wide use as a water-soluble polymeric electrolyte, for example, as thickner, dispersant, protective colloid and adhesive. CMC is commercially available usually in the form of a sodium salt, while an ammonium salt and a calcium salt thereof are also available as commercial products for some uses. The calcium salt, which is insoluble in water, is used chiefly as a disintegrator.

Thus, CMC is commercially available usually in the form of a salt-type CMC, whereas CMC of the acid type which is prepared by converting some or all of the salt-type carboxymethyl groups to groups of the free acid type is not provided as a commercial product.

This is due to the reason that the acid-type CMC obtained by the conventional process (wherein salt-type CMC which is 0.5 to 1.7 in the degree of substitution by carboxymethyl groups is modified with an acid as disclosed, for example, in Kagaku Kogyo Shiryo (Chemical Industry Data), 30, 191–204, (1962)), whether of the total acid type or of the partial acid type, is soluble neither in water nor in organic solvents, is therefore difficult to handle and finds limited use only as an absorbent material (e.g. Published Unexamined Japanese Patent Application SHO 56-28755), etc.

On the other hand, it is likely that a very small amount of acid-type carboxymethyl groups is detected in commercial alkali salt-type CMC's. When the amount is at least 2% of the total degree of substitution by carboxymethyl groups, the CMC is partly insoluble in water, while if the amount is at least 5%, the CMC is almost insoluble in water. This appears attributable to the insolubilization of CMC that could result, for example, when some of the acid-type carboxymethyl groups underogo ester linkage (crosslinking) with hydroxyl groups in the same molecule and adjacent molecules during the conventional process for preparing the CMC, especially during the drying step.

Thus the conventional acid-type CMC is thought to be insoluble in water and also in organic solvents.

SUMMARY OF THE INVENTION

An object of the present invention, which has been accomplished in view of the foregoing problem, is to obtain an acid-type CMC which is soluble at least in water.

The present invention provides an acid-type carboxymethyl cellulose characterized by:

(a) having a total degree of substitution "x" by carboxymethyl groups of 0.42 to 3.00 per anhydrous glucose unit, the degree of substitution "y" by acid-type carboxymethyl groups being 5 to 100% of the total degree of substitution (but up to (1.25 × −0.5) when "x" is less than 2.0), the remaining carboxymethyl groups being of the alkali salt type, (b) having an average degree of polymerization of 50 to 1500, and (c) being soluble in water, and a process for preparing the same.

DESCRIPTION OF THE PREFERRED EMBODIMENT

According to the present invention, the acid-type CMC means a CMC wherein some or all of the carboxymethyl groups are in the free acid form of carboxymethyl groups, and salt-type CMC means a CMC having carboxymethyl groups in the salt form.

The term "total degree of substitution x" as used in this invention refers to the average degree of substitution by carboxymethyl groups calculated for the cellulose concerned per anhydrous glucose unit (average number of the substituents, 3.0 max.). The term "degree of substitution y" refers to the average number of acid-type carboxymethyl substituents included in these groups.

The acid-type CMC of the present invention is 50 to 1500, preferably 150 to 1000, in average degree of polymerization (the number of repeating anhydrous glucose units). The upper limit of 1500 is set for the degree of polymerization because CMC's produced by the usual process is up to about 1500 in average degree of polymerization. Further those less than the lower limit of 50 in this value are not desirable from the viewpoint of production or use of acid-type CMC.

While the method of measuring the degree of substitution (DS) of acid-type CMC of the invention and method of measuring the degree of polymerization thereof are given later, the DS value involves a measuring error of ±several percent, so that if the DS of a particular CMC is smaller or larger than the above-specified range of DS by such a measuring error, the CMC is included in the acid-type CMC of the present invention. This is also true of the average degree of polymerization of acid-type CMC.

When the total DS (x) of CMC is not less than 0.42 but less than 2.0 according to the invention, the DS (y) by acid-type carboxymethyl groups should be up to 1.25x−0.5 because this is a critical requirement for obtaining water-soluble CMC of the partial acid type. The term "water-soluble" herein used means that the CMC is soluble to a concentration of at least 1% by weight. Further the definition that the DS (y) by acid-type carboxymethyl groups is at least 5% of the total DS (x) is particularly indicative of the characteristics of partial acid-type CMC of the invention that it is soluble in water even if at least 5% of the total DS thereof is of the acid type, i.e., if the DS by alkali salt-type carboxymethyl groups is less than 0.95x, although of the conventional alkali salt-type CMC's, those wherein acid-type carboxymethyl groups account for at least 5% of the total DS thereof are insoluble in water as already stated.

Figure 1:
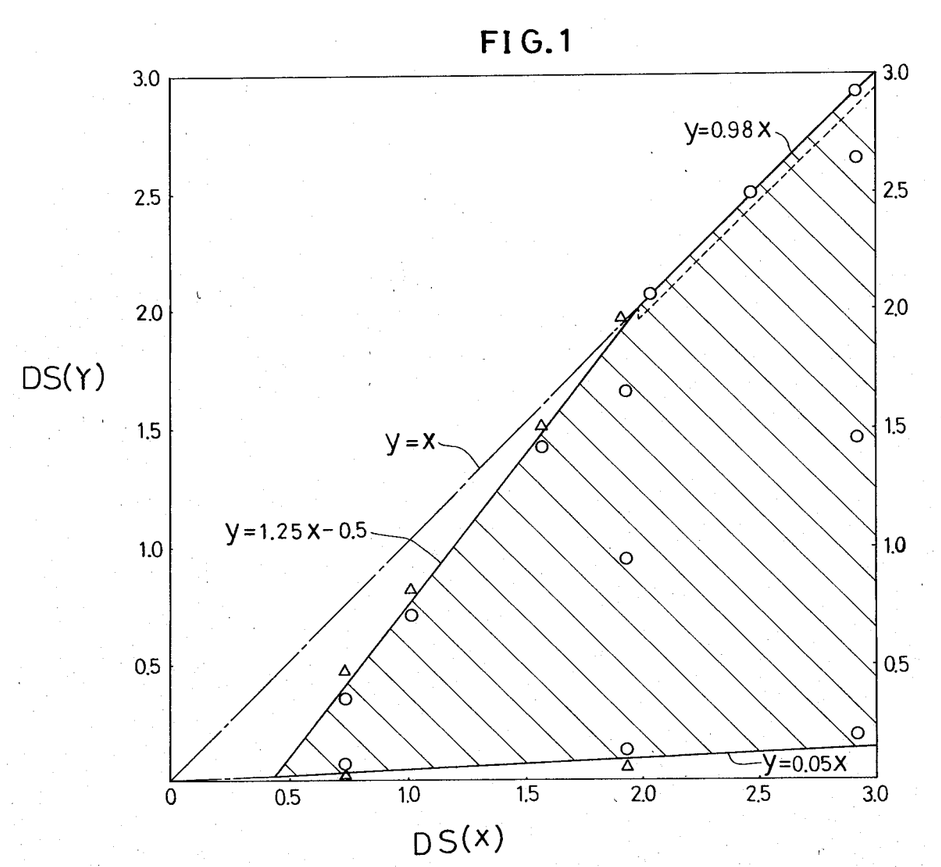
FIG. 1 is a graph showing the relationship between the degrees of substitution "x" and "y" of acid-type CMC's of the present invention.

FIG. 1 shows the relationship between the total DS (x) and the DS (y) established for acid-type CMC's according to the invention. The hatched area in the diagram indicates the range of acid-type CMC's of the invention. The plotted values correspond to the examples (o) and comparison examples (Δ) to be given later.

The acid-type CMC's can be divided into water-soluble ones and those soluble in water and organic solvents.

According to the invention, the total acid-type CMC's which have a total DS (x) of at least 2.0 and in which the carboxymethyl groups are substantially of the free acid type are soluble in water and organic solvents.

The expression "the carboxymethyl groups are substantially of the free acid type" herein used means that at least 98%, preferably at least 99%, of the caryboxymethyl groups are free-acid type carboxymethyl groups. In other words, this means that the CMC is of the free acid type to such extent that no salt-type carboxymethyl groups are detected by usual analysis (this corresponds to the area surrounded by a broken line in FIG. 1). Further the expression "soluble in water and organic solvents" means that the CMC is soluble to a concentration of at least 1% in water and organic solvents such as dimethyl sulfoxide (hereinafter referred to as "DMSO") and ethylene glycol.

With the total acid-type CMC's, the total DS by carboxymethyl groups per anhydrous glucose unit, which is at least 2.0, is usually in the range of 2.0 to 3.0, preferably in the range of 2.0 to 2.9, more preferably 2.4 to 2.9. For example, it is 2.4, 2.5, 2.6, 2.7 or 2.8.

The solubility of the total acid-type CMC in water and organic solvents appears attributable chiefly to the fact that since the DS is at least 2.0, the crystallinity due to the hydrogen bond, etc. of the cellulose material has been completely lost.

The acid-type CMC's of the invention other than the total acid-type CMC's are almost all of the partial acid type (y<0.98x) and are soluble in water but insoluble in organic solvents. However, they are soluble in an organic solvent containing at least 40 w/w % of water.

The carboxymethyl groups other than those of the acid-type and contained in the partial acid-type CMC are of the alkali salt type. Examples of useful alkali salts are lithium, sodium, potassium, rubidium and cesium salts, among which sodium salt is inexpensive and most preferable.

The solubility of such partial acid-type CMC's in water appears attributable chiefly to the fact that the acid-type carboxymethyl groups present are substantially in the form of a free acid without contributing to crosslinking with other molecules.

The present invention further provides processes for preparing the water-soluble acid-type CMC. Typical processes will be described below.

One process comprises dissolving an alkali salt-type CMC having a DS of 0.42 to 3.0 in water at room temperature, adding to the solution an inorganic acid in a chemically equivalent amount corresponding to the DS (y) of the contemplated acid-type CMC, thoroughly stirring the mixture, adding the resulting solution in small portions to an organic solvent to obtain a precipitate, purifying the precipitate with an organic solvent containing up to 40 w/w% of water and drying the product in air at room temperature.

Another process comprises dispersing an alkali salt-type CMC having a DS of 0.42 to 3.0 in an organic solvent containing up to 40 w/w% of water, adding to the solution an inorganic acid in a chemically equivalent amount corresponding to the DS (y) of the contemplated acid-type CMC, stirring the mixture at room temperature, purifying the product in an organic solvent containing up to 40 w/w% of water and drying the product in air at room temperature.

The process may be repeated until the contemplated DS (y) is achieved.

Examples of alkali salts of CMC useful as starting materisls are sodium salt, potassium salt and like alkali metal salts, ammonium salt, potassium salt, etc. of CMC. Among these, sodium salt is desirable.

Further as to alkali salt-type CMC's having a DS of 0.42 to 3.0 and serving as starting materials, those having a DS of 0.4 to 1.7 are commercially available, while those having a DS of 1.8 to 3.0 can be obtained by known processes (Canadian Journal of Research, 28, Sec. B, pp. 731–736, (1950) and Published Unexamined Japanese Patent Application SHO 58-45201) and can be prepared easily also by a process developed by the present inventor (see Published Unexamined Japanese Patent Application SHO 58-176202).

Inorganic acids usable for the two typical processes described above are commercial concentrated sulfuric acid (98%), concentrated hydrochloric acid (35%), concentrated nitric acid (61%) and concentrated phosphoric acid (75%). Also usable are other concentrated inorganic acids such as sulfuric anhydride, liquefied hydrogen chloride, etc. It is further possible to use such inorganic acids as diluted to a desired concentration with water and an organic solvent.

Examples of useful organic solvents are methyl alcohol, ethyl alcohol, n-propyl alcohol, isopropyl alcohol, tert-butyl alcohol, acetone, dioxane, tetrahydrofuran, etc. The stirring of the mixture of starting mateiral and inorganic acid, and precipitation and purification of the acid-type CMC in a water-containing organic acid are carried out at 0° to 50° C., preferably at a relatively low temperature of 10° to 30° C. The purified acid-type CMC is dried at 0° to 50° C., preferably at a relatively low temperature of 10° to 30° C. It is desirable to thereby cause the dried product to retain at least 5%, preferably at least 10%, of volatile content because if the acid-type CMC is treated at a high temperature or dried to excess, acid-type carboxymethyl groups are likely to undergo ester linkage with hydroxyl group in the molecule or those of adjacent molecules to render the product insoluble in water.

Since the acid-type CMC's of the present invention are soluble in water, or in both water and organic solvents, they are useful for various applications. For example, the present acid-type CMC's, which have highly reactive free acid-type carboxymethyl groups and are soluble in solvents, are useful as intermediate materials for preparing new derivatives by being reacted with other chemicals, for example, for immobilizing enzymes. While CMC's, when having the smallest possible sodium content, are useful as dispersants for glazes for china and porcelain, as binders for ceramics and as materials for the intermediate layer of electrophotographic photosensitive members between the electrically conductive substrate and the photoconductive layer thereof, the present CMC's are also useful as such materials. Furthermore the total acid-type CMC's of the present invention are useful as enteric coating agents because they do not dissolve in the acidic gastric juice but dissolve in the intestinal juice, enabling the medicinal agent coated therewith to act effectively.

The processes for preparing acid-type CMC's according to the present invention will be described with reference to the following examples, to which the invention is not limited and in which the parts and percentages are by weight.

EXAMPLE 1

Into a 2-liter separable flask equipped with a stirrer were placed 50.0 parts of sodium salt of CMC (DS 2.92, average degree of polymerization 320, purity 94.0%) and 1617 parts of pure water, and the mixture was stirred at room temperature to dissolve the CMC salt. Subsequently 32.2 parts of 61.0% nitric acid was added in small portions to the solution at room temperature, and the mixture was then stirred at 25° C. for 30 minutes. The reaction mixture was added in small portions to 15000 parts of 99% acetone with vigorous stirring to separate out a partial acid-type CMC, and the precipitate was filtered off to obtain the partial acid-type CMC as a crude.

Next, the crude partial acid-type CMC was washed with 1000 parts of 75% aqueous solution of acetone twice at room temperature and was further treated with 500 parts of 99% acetone. The product was thereafter dried in air at room temperature to obtain 37.8 parts of a partial acid-type CMC of the invention.

When analyzed, the partial acid-type CMC was found to have the following structure.
(1) DS of sodium salt-type carboxyl groups: 0.29
(2) DS of acid-type carboxyl groups: 2.63
(3) Average degree of polymerization: 310
(4) IR absorption spectrum analysis:
Shown in FIG. 2. The wave numbers of main absorption bands and the groups to which the absorption is due are as follows.

Figure 2:
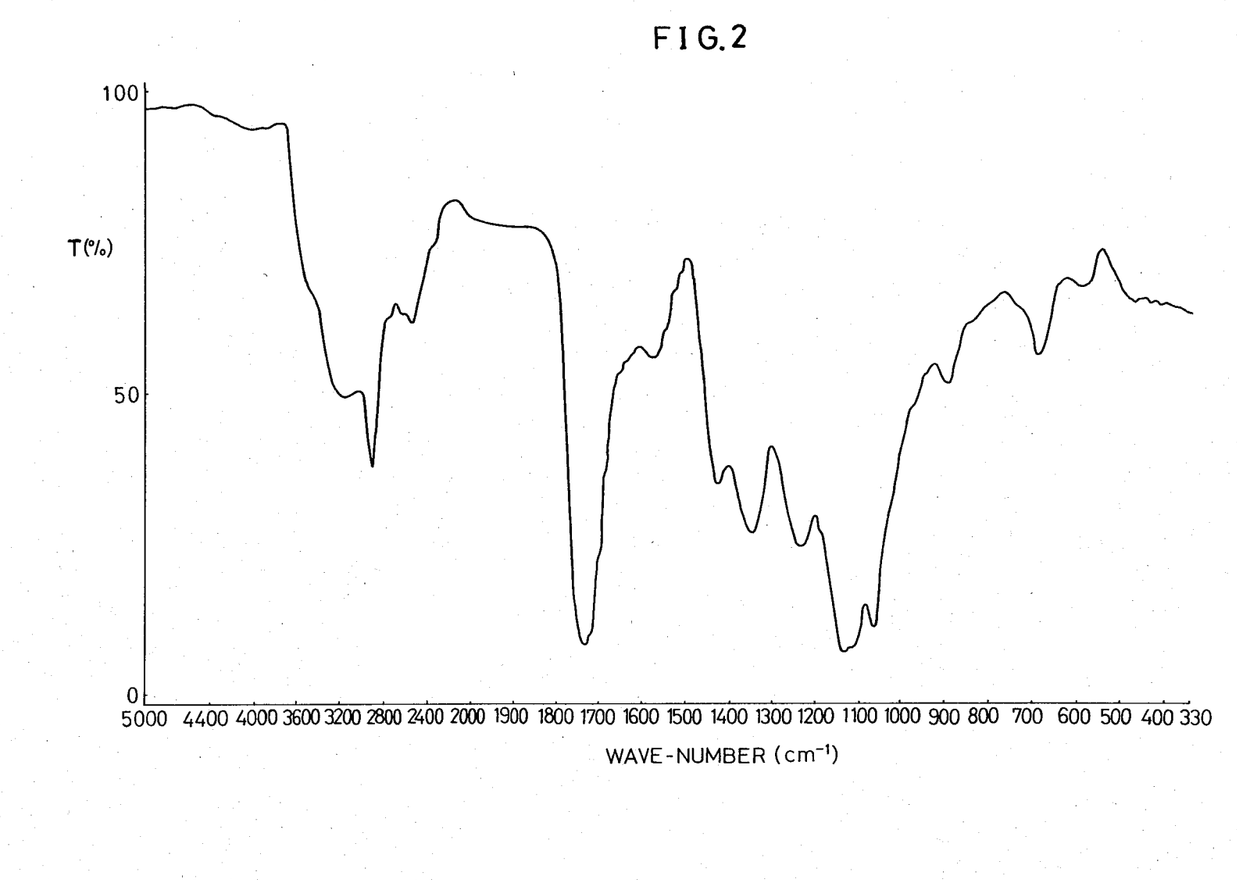
FIG. 2 and FIG. 3 are infrared absorption spectrograms of partial acid-type CMC's of the invention.

| Wave number (cm$^{-1}$) | Assignment |
| --- | --- |
| 2950 | —CH$_2$— (methylene group) |
| 1700–1800 | —COOH (acid-type carboxyl group) |
| 1560–1600 | —COONa (sodium-type carboxyl group) |
| Near 1100 | —C—O—C— (ether bond) |

The partial acid-type CMC had a volatile content of 12.0% and completely dissolved in water to form 1% solution.

EXAMPLE 2

Into a 1-liter separable flask equipped with a stirrer were placed 30 parts of sodium salt of CMC (DS 1.02, average degree of polymerization 1200, purity 95.0%) and 750 parts of 80% aqueous methyl alcohol solution. With stirring at room temperature, 8.6 parts of 35.5% hydrochloric acid was added in small portions to the mixture. The resulting mixture was thereafter stirred at room temperature for 30 minutes. Subsequently the reaction mixture was filtered to obtain a crude partial acid-type CMC. The product was washed with 750 parts of 75% aqueous solution of methyl alcohol twice, further treated with 500 parts of 99% methyl alcohol and then dried in air at room temperature to obtain 28.2 parts of a partial acid-type CMC according to the invention.

When analyzed, the partial acid-type CMC was found to have the following structure.

(1) DS of sodium salt-type carboxyl groups: 0.31
(2) DS of acid-type carboxyl groups: 0.71
(3) Average degree of polymerization: 1100
(4) IR absorption spectrum:
Shown in FIG. 3. Given below are the wave numbers of main absorption bands and the groups concerned.

Figure 3:
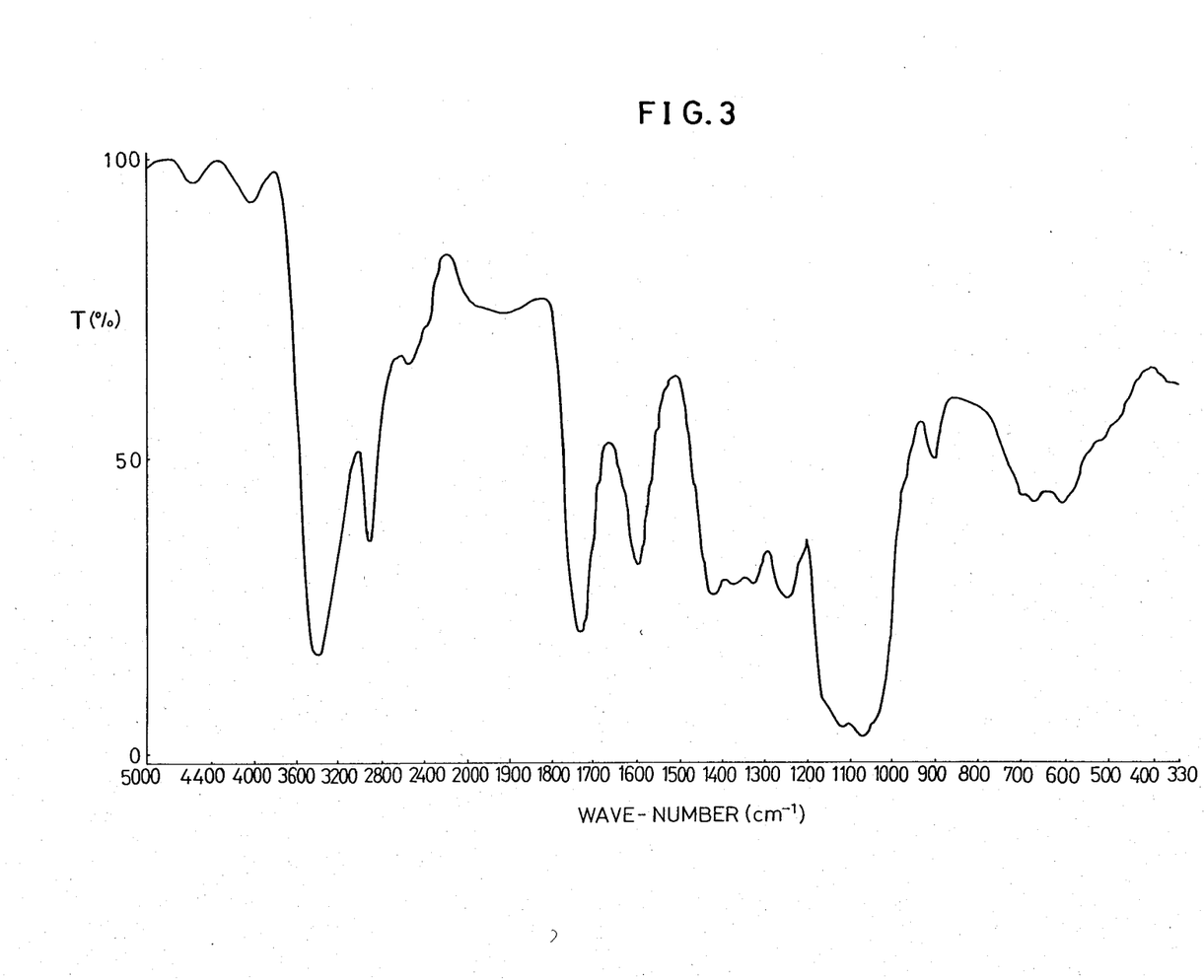

| Wave number (cm$^{-1}$) | Assignment |
| --- | --- |
| 2925 | —CH$_2$— (methylene group) |
| 1700–1800 | —COOH (acid-type carboxyl group) |
| 1580–1620 | —COONa (sodium salt-type carboxyl group) |
| Near 1100 | —C—O—C— (ether bond) |

The partial acid-type CMC had a volatile content of 13.5% and completely dissolved in water to form 1% solution.

COMPARISON EXAMPLE 1

Into a 1-liter separable flask equipped with a stirrer were placed 30 parts of sodium salt of CMC (DS 1.02, average degree of polymerization 1200, purity 95.0%) and 750 parts of 80% aqueous solution of methyl alcohol. With stirring at room temperature, 9.8 parts of 35.5% hydrochloric acid was added in small portions to the mixture. The resulting mixture was stirred at room temperature for 30 minutes. Subsequently the reaction mixture was filtered to obtain a crude partial acid-type CMC. The product was washed with 750 parts of 75% aqueous solution of methyl alcohol twice, further treated with 500 parts of 99% methyl alcohol and then dried in air at room temperature to obtain 27.8 parts of a partial acid-type CMC.

When analyzed, the partial acid-type CMC was found to have the following structure.
(1) DS of sodium salt-type carboxyl groups: 0.20
(2) DS of acid-type carboxyl groups: 0.82
The partial acid-type CMC had a volatile content of 13.2% and did not dissolve in water although the product swelled.

EXAMPLES 3 AND 4

In each of these examples, a partial acid-type CMC of the invention was prepared exactly in the same manner as in Example 1 with the exception of using CMC and 61.0% nitric acid in different amounts. The details are shown in Table 1.

EXAMPLES 5, 6, 7 AND 8

Partial acid-type CMC's according to the invention were prepared exactly in the same manner as in Example 2 except that CMC and 35.5% hydrochloric acid were used in different amounts. The details are given in Table 1.

COMPARISON EXAMPLES 2 AND 3

Partial acid-type CMC's were prepared exactly in the same manner as in Comparison Example 1 except that CMC and 35.5% hydrochloric acid were used in different amounts. The details are listed in Table 1.

COMPARISON EXAMPLE 4

Into a 1-liter separable flask equipped with a stirrer were placed 30 parts of sodium salt of CMC (DS 1.58, average degree of polymerization 680, purity 94%) and 750 parts of 80% aqueous solution of methyl alcohol. With stirring at 55° C., 2.5 parts of 10.0% hydrochloric acid was added to the mixture. The resulting mixture was stirred at 55° C. for 30 minutes. Subsequently the reaction mixture was filtered to obtain a crude partially acid-type CMC. The product was washed with 750 parts of 75% aqueous solution of methyl alcohol twice at 55° C., further treated with 500 parts of 99% methyl alcohol and then dried at 80° to 100° C. for 4 hours, giving 28.8 parts of a partial acid-type CMC. Table 1 shows the details of the product.

COMPARISON EXAMPLE 5

A partial acid-type CMC was prepared exactly in the same manner as in Comparison Example 4 except that CMC and 35.5% hydrochloric acid were used in different amounts. Table 1 shows the details.

EXAMPLE 9

Into 1-liter separable flask equipped with a stirrer were placed 30.0 parts of sodium salt of CMC (DS 2.92, average degree of polymerization 320, purity 94.0%) and 750 parts of 80% aqueous solution of acetone. With stirring at room temperature, 10.7 parts of 61.0% nitric acid was added in small portions to the mixture. The resulting mixture was stirred at room temperature for 30 minutes. Subsequently the reaction mixture was filtered to obtain a crude partial acid-type CMC. The product was washed with 750 parts of 75% aqueous solution of acetone three times, further treated with 500 parts of 99% acetone and then dried in air at room temperature, giving 28.4 parts of a partial acid-type CMC according to the invention. Table 1 shows the details of the product.

EXAMPLE 10

A partial acid-type CMC was prepared according to the invention exactly in the same manner as in Example 9 except that 61.0% nitric acid was used in a different amount. Table 1 shows the details.

mixture was then stirred at 25° C. for 30 minutes. The reaction mixture was added in small portions to 15000 parts of 99% acetone with vigorous stirring to separate out an acid-type CMC, and the precipitate was filtered off to obtain the acid-type CMC as a crude. Next, the crude acid-type CMC was washed with 1000 parts of 95% aqueous solution of acetone four times, further treated with 500 parts of 99% acetone and thereafter dried at room temperature, giving 37.3 parts of a total acid-type CMC. The product had the following structure.

Figure 4:
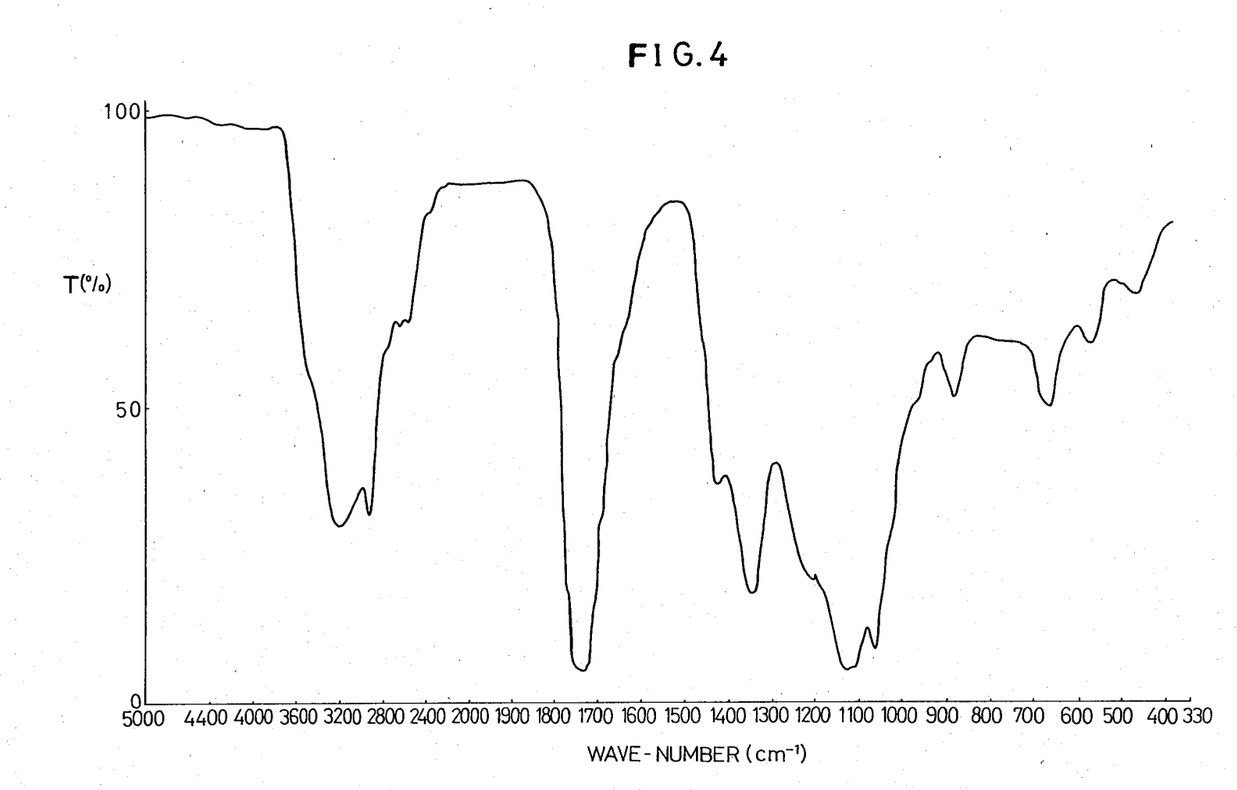
FIG. 4, FIG. 5 and FIG. 6 are infrared absorption spectrograms of total acid-type CMC's of the invention.

(1) DS of acid-type carboxymethyl groups: 2.92
(2) Degree of polymerization: 280
(3) IR absorption spectrum analysis:

Shown in FIG. 4. Given below are the wave numbers of main absorption bands and the groups concerned.

| Wave number (cm$^{-1}$) | Assignment |
| --- | --- |
| 2925 | —CH$_2$— |
| 1700–1800 | —COOH (acid-type carboxyl group) |
| Near 1100 | —C—O—C— (ether bond) |

The acid-type CMC completely dissolved in water, DMSO, ethylene glycol, 80% aqueous methyl alcohol solution, 70% aqueous acetone solution and like solvents, forming 1% solutions.

The product was found to contain 0.1% of remaining sodium.

EXAMPLE 12

Into 1-liter separable flask equipped with a stirrer and a reflux condenser were placed 50.0 parts of finely divided sodium salt of CMC (DS 2.47, polymerization degree 470, purity 95%) and 500 parts of 95% aqueous solution of acetone. With stirring at room temperature, 40.4 parts of 61% nitric acid was added in small portions to the mixture, and the resulting mixture was stirred at

TABLE 1

| | CMC starting material | | | | Inorganic acid | | Partial acid-type CMC | | | | | |
| --- | --- | --- | --- | --- | --- | --- | --- | --- | --- | --- | --- | --- |
| | Purity (%) | DS | Av. DP* | Amount used (parts) | Kind | Amount used (parts) | Amount formed (parts) | Volatiles (%) | Acid type DS | Na salt type DS | Av. DP* | Solubility in water |
| Ex. 3 | 94.0 | 1.94 | 680 | 40.0 | 61.0% HNO$_3$ | 20.2 | 35.5 | 10.5 | 1.65 | 0.29 | 650 | Soluble |
| Ex. 4 | 94.0 | 1.94 | 680 | 40.0 | 61.0% HNO$_3$ | 11.9 | 37.6 | 12.6 | 0.95 | 0.99 | 670 | Soluble |
| Ex. 5 | 94.0 | 1.94 | 680 | 30.0 | 35.5% HCl | 1.4 | 30.8 | 14.0 | 0.14 | 1.80 | 680 | Soluble |
| Ex. 6 | 92.0 | 1.58 | 750 | 30.0 | 35.5% HCl | 14.0 | 27.5 | 13.5 | 1.42 | 0.16 | 730 | Soluble |
| Ex. 7 | 93.0 | 0.73 | 350 | 30.0 | 35.5% HCl | 4.7 | 29.5 | 12.8 | 0.36 | 0.37 | 340 | Soluble |
| Ex. 8 | 93.0 | 0.73 | 350 | 30.0 | 35.5% HCl | 0.9 | 28.0 | 13.0 | 0.08 | 0.65 | 350 | Soluble |
| Comp. Ex. 2 | 92.0 | 1.58 | 750 | 30.0 | 35.5% HCl | 14.8 | 27.3 | 13.8 | 1.50 | 0.08 | ** | Swelling but insoluble |
| Comp. Ex. 3 | 93.0 | 0.73 | 350 | 30.0 | 35.5% HCl | 6.2 | 29.0 | 13.5 | 0.48 | 0.25 | ** | Swelling but insoluble |
| Comp. Ex. 4 | 94.0 | 1.94 | 680 | 30.0 | 10.0% HCl | 2.5 | 28.8 | 4.5 | 0.08 | 1.86 | ** | Almost insoluble |
| Comp. Ex. 5 | 93.0 | 0.73 | 350 | 30.0 | 10.0% HCl | 1.3 | 27.5 | 4.0 | 0.03 | 0.70 | ** | Almost insoluble |
| Ex. 9 | 94.0 | 2.92 | 320 | 30.0 | 61.0% HNO$_3$ | 10.7 | 28.4 | 11.5 | 1.45 | 1.47 | 320 | Soluble |
| Ex. 10 | 94.0 | 2.92 | 320 | 30.0 | 61.0% HNO$_3$ | 1.5 | 30.2 | 12.0 | 0.20 | 2.72 | 320 | Soluble |

*Average degree of polymerization.
**Not measurable because of insolubility.

EXAMPLE 11

Into a 2-liter separable flask equipped with a stirrer were placed 50.0 parts of sodium salt of CMC (DS 2.92, average degree of polymerization 320, purity 94%) and 1617 parts of pure water, and the mixture was stirred at room temperature to dissolve the CMC salt. Subsequently 39.4 parts of 61% nitric acid was added in small portions to the solution at room temperature, and the 25° C. for 2 hours. The mixture was thereafter filtered to obtain a crude acid-type CMC. Next, the crude product was washed with 1000 parts of 92% aqueous solution of acetone six times, then treated with 500 parts of 99% acetone and thereafter dried at room temperature, giving 43.5 parts of a total acid-type CMC. This product was found to have the following structure.

(1) DS of acid-type carboxyl groups: 2.47

(2) Degree of polymerization: 380
(3) IR absorption spectrum analysis:
Shown in FIG. 5. Given below are the wave numbers of the main absorption bands and the groups concerned.

Figure 5:
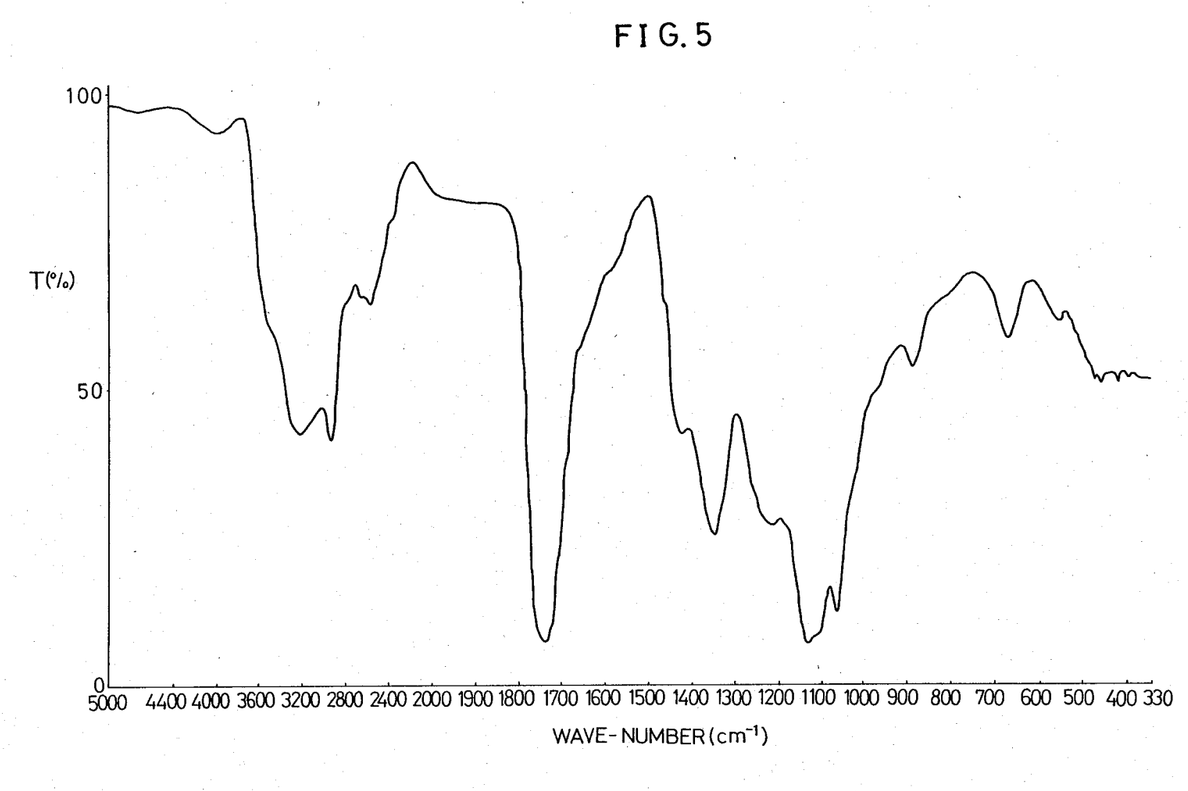

| Wave number (cm$^{-1}$) | Assignment |
|---|---|
| 2925 | —CH$_2$— |
| 1700–1800 | —COOH (acid-type carboxyl group) |
| Near 1100 | —C—O—C— (ether bond) |

The acid-type CMC completely dissolved in water, DMSO, ethylene glycol, 80% aqueous solution of methyl alcohol solution, 70% aqueous acetone solution and like solvents, forming 1% solutions.

EXAMPLE 13

Into a 2-liter separable flask equipped with a stirrer were placed 40.0 parts of sodium salt of CMC (DS 2.05, degree of polymerization 650, purity 95%) and 1560 parts of pure water, and the mixture was stirred at room temperature to dissolve the CMC salt. Subsequently 27.1 parts of 61% nitric acid was added in small portions to the solution at room temperature, and the mixture was then stirred at 25° C. for 30 minutes. The reaction mixture was added in small portions to 14000 parts of 99% acetone with vigorous stirring to separate out an acid-type CMC, and the precipitate was filtered off to obtain the acid-type CMC as a crude. Next, the crude product was washed with 1000 parts of 92% aqueous solution of acetone three times, further treated with 500 parts of 99% acetone and thereafter dried at room temperature, affording 33.2 parts of a total acid-type CMC of the invention. The total acid-type CMC was found to have the following structure.
(1) DS of acid-type carboxymethyl groups: 2.05
(2) Degree of polymerization: 610
(3) IR absorption spectrum analysis:
Shown in FIG. 6. Given below are the wave numbers of the main absorption bands and the groups concerned.

Figure 6:
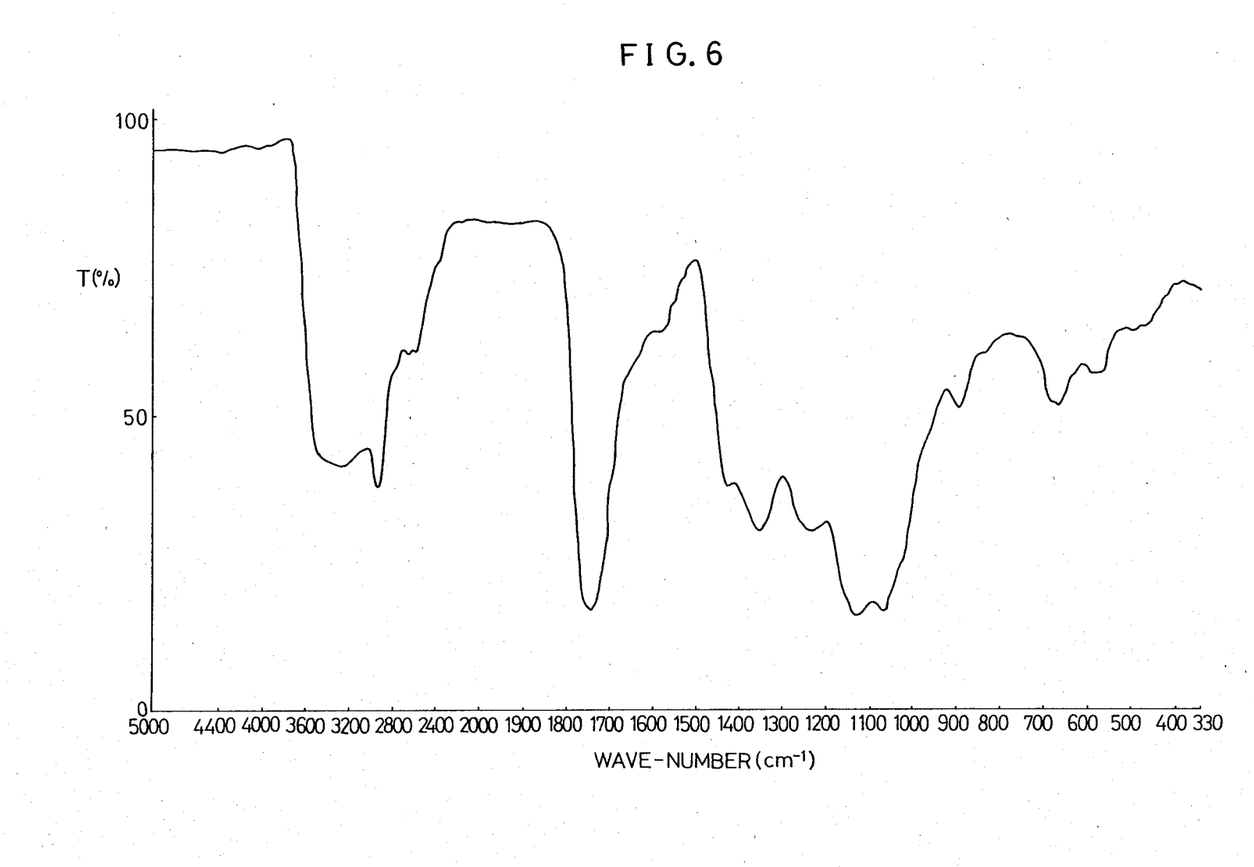

| Wave number (cm$^{-1}$) | Assignment |
|---|---|
| 2925 | —CH$_2$— |
| 1700–1800 | —COOH (acid-type carboxyl group) |
| Near 1100 | —C—O—C— (ether bond) |

The acid-type CMC dissolved in water to form 1% solution which had slightly white turbidity. The product further completely dissolved in DMSO, ethylene glycol, 70% aqueous solution of methyl alcohol and like solvents, forming 1% solutions.

COMPARISON EXAMPLE 6

Into a 2-liter separable flask equipped with a stirrer were placed 40.0 parts of sodium salt of CMC (DS 1.94, degree of polymerization 680, purity 94%) and 1560 parts of pure water, and the mixture was stirred at room temperature to dissolve the CMC salt. Subsequently 26.1 parts of 61% nitric acid was added in small portions to the solution at room temperature, and the mixture was then stirred at 25° C. for 30 minutes. The reaction mixture was added in small portions to 14000 parts of 99% acetone with vigorous stirring to separate out an acid-type CMC, and the precipitate was filtered off to obtain the acid-type CMC as a crude.

Next, the crude acid-type CMC was washed with 1000 parts of 92% aqueous solution of acetone three times, further treated with 500 parts of 99% acetone and thereafter dried at room temperature, affording 31.8 parts of a total acid-type CMC. The product was found to have the following structure.
(1) DS of acid-type carboxymethyl groups: 1.94
(2) Degree of polymerization not measurable because of insolubility in solvents:

The acid-type CMC did not dissolve in water, DMSO, ethylene glycol, 70% aqueous solution of methyl alcohol or like solvent although swelling only slightly.

Next, test methods are described.
(1) Degree of substitution (DS) of CMC sodium salt
One gram of CMC (calculated as being pure) was placed into a porcelain crucible and ashed at 600° C. The resulting sodium oxide was neutralized with 100 ml of N/10 H$_2$SO$_4$. Next, the excess of H$_2$SO$_4$ was titrated with N/10 NaOH using phenolphthalein as an indicator. The DS was calculated from the following equation based on the amount of titrant, A ml.

$$DS = \frac{162(100f_1 - Af_2)}{10000 - 80(100f_1 - Af_2)}$$

where
 f$_1$: factor of N/10 H$_2$SO$_4$
 f$_2$: factor of N/10 NaOH
(2) DS of acid-type CMC
One gram of acid-type CMC (calculated as being pure) was dissolved in a flask containing 200 ml of pure water and 100 ml of N/10 NaOH. Next, the excess of N/10 NaOH was titrated with N/10 H$_2$SO$_4$ using phenolphthalein as an indicator. The DS was calculated from the following equation based on the amount of titrant, B ml, added.

$$DS = \frac{162(100f_2 - Bf_1)}{10000 - 58(100f_2 - Bf_1)}$$

where
 f$_1$: factor of N/10 H$_2$SO$_4$
 f$_2$: factor of N/10 NaOH
(3) DS of partial acid-type CMC
One gram of sample (calculated as being pure) was dissolved in a flask containing 200 ml of pure water and 100 ml of N/10 NaOH. Next, the excess of N/10 NaOH was titrated with N/10 H$_2$SO$_4$ using phenolphthalein as an indicator to obtain the amount of titrant, B ml.

Next, another 1-gram portion of sample (calculated as being pure) was placed into a porcelain crucible and ashed at 600° C. The resulting sodium oxide was neutralized with 100 ml of N/10 H$_2$SO$_4$. Subsequently the excess of H$_2$SO$_4$ was titrated with N/10 NaOH using phenolphthalein as an indicator to obtain the amount of titrant, C ml.

The DS of sodium salt-type carboxyl groups and the DS of acid-type carboxyl groups were calculated from the following equations.

$$DS \text{ of sodium salt-type carboxyl groups} = \frac{162(100f_1 - Cf_2)}{10000 - 58(100f_2 - Bf_1) - 80(100f_1 - Cf_2)}$$

$DS$ of acid-type carboxyl groups =

$$\frac{162(100f_2 - Bf_1)}{10000 - 58(100f_2 - Bf_1) - 80(100f_1 - Cf_2)}$$

where
- $f_1$: factor of N/10 $H_2SO_4$
- $f_2$: factor of N/10 NaOH (4) Average degree of polymerization The molecular weight was measured by the osmotic pressure method to determine the degree of polymerization. The solvent used for the measurement was 0.25N NaCl aqueous solution.

(5) IR absorption spectrum

The partial acid-type CMC was made into 2% aqueous solution, which was spread over a glass plate and dried at 100° C. for 2 hours. The film obtained was used for analysis.

What is claimed is:

1. A carboxymethyl cellulose having a free acid form of carboxymethyl groups which is characterized by:
   (a) having a total degree of substitution "x" by carboxymethyl groups of 0.42 to 3.00 per anhydrous glucose unit, the degree of substitution "y" by acid-form carboxymethyl groups being 5 to 100% of the total degree of substitution, provided that when "x" is less than 2.0, "y" shall be less than (1.25x−0.5), the remaining carboxymethyl groups being in the alkali salt form,
   (b) having an average degree of polymerization of 50 to 1500, and
   (c) being soluble in water.

2. A carboxymethyl cellulose having a free acid form of carboxymethyl groups of claim 1 wherein alkali salt is selected from the group consisting of lithium, sodium, potassium, rubidium and cesium salts.

3. A carboxymethyl cellulose having a free acid form of carboxymethyl groups of claim 2 wherein the alkali salt is sodium salt.

4. A carboxymethyl cellulose having a free acid form of carboxymethyl groups of claim 1 wherein the total degree of substitution "x" is at least 2.0 and the carboxymethyl groups are substantially of the free acid form.

5. A carboxymethyl cellulose having a free acid form of carboxymethyl groups of claim 1 wherein the average degree of polymerization is 150 to 1000.

6. A process for preparing carboxymethyl cellulose having a free acid form of carboxymethyl groups as defined in claim 1 which comprises dissolving an alkali salt-form CMC having a DS of 0.42 to 3.0 in water, adding to the solution an inorganic acid to convert the alkali salt-form CMC to an acid-form CMC, adding the resulting solution in small portions to an organic solvent to obtain a precipitate, and purifying the precipitate with an organic solvent containing up to 40 w/w% of water.

7. A process of claim 6 in which the inorganic acid is selected from the group consisting sulfuric acid, hydrochloric acid, nitric acid and phosphoric acid.

8. A process of claim 6 in which the organic solvent is selected from the group consisting methyl alcohol, ethyl alcohol, n-propyl alcohol, iso-propyl alcohol, tert-butyl alcohol, acetone, dioxane and tetrahydrofuran.

9. A process of claim 6 in which the addition, precipitation and purification procedures are conducted at 0° to 50° C.

10. A process for preparing carboxymethyl cellulose having a free acid form of carboxymethyl groups as defined in claim 1 which comprises dispersing an alkali salt CMC having a DS of 0.42 to 3.0 in an organic solvent containing up to 40 w/w% of water, adding to the solution an inorganic acid to convert the alkali salt-form CMC to an acid-form CMC and purifying the product in an organic solvent containing up to 40 w/w% of water.

11. A process of claim 10 in which the addition and purification procedures are conducted at 0° to 50° C.

* * * * *